United States Patent
Iijima

(10) Patent No.: US 7,244,494 B2
(45) Date of Patent: Jul. 17, 2007

(54) ANTIREFLECTION FILM AND OBJECT HAVING UNDERGONE ANTIREFLECTION TREATMENT

(75) Inventor: Tadayoshi Iijima, Tokyo (JP)

(73) Assignee: TDK Corporation, Tokyo (JP)

( * ) Notice: Subject to any disclaimer, the term of this patent is extended or adjusted under 35 U.S.C. 154(b) by 85 days.

(21) Appl. No.: 10/521,757

(22) PCT Filed: Jul. 25, 2003

(86) PCT No.: PCT/JP03/09499

§ 371 (c)(1), (2), (4) Date: Jan. 19, 2005

(87) PCT Pub. No.: WO2004/011243

PCT Pub. Date: Feb. 5, 2004

(65) Prior Publication Data

US 2005/0249941 A1 Nov. 10, 2005

(30) Foreign Application Priority Data

Jul. 31, 2002 (JP) .............................. 2002-222900

(51) Int. Cl.
  *B32B 7/02* (2006.01)
  *B32B 7/06* (2006.01)
  *G02B 1/10* (2006.01)

(52) U.S. Cl. ...................... 428/354; 428/343; 428/328; 428/329; 428/355 AC

(58) Field of Classification Search ................ 428/354, 428/343, 328, 329, 355 AC
See application file for complete search history.

(56) References Cited

U.S. PATENT DOCUMENTS 5,747,152 A 5/1998 Oka et al.

FOREIGN PATENT DOCUMENTS

| JP | 9-254324 | 9/1997 |
|----|----------|--------|
| JP | 9-269403 | 10/1997 |
| JP | 2000-338306 | 12/2000 |
| JP | 2002-323602 | 11/2002 |
| JP | 2003-1744 | 1/2003 |

OTHER PUBLICATIONS

Note the partial Machine Translations of JP Publications 2000-338306, 09-269403, and 09-254324.*

* cited by examiner

*Primary Examiner*—Daniel Zirker
(74) *Attorney, Agent, or Firm*—Oblon, Spivak, McClelland, Maier & Neustadt, P.C.

(57) ABSTRACT

The present invention provides an antireflection film for transfer that can be transferred to the surface of plates or other less-flexible articles to form an antireflection layer with a uniform thickness that not only provides a high antireflection effect on a light in the visible light range but also offers a high solvent resistance. The present invention also provides an antireflection-treated article. An antireflection film for transfer comprising a support (1); an antireflection layer (2) comprising a low refractive index layer (2*a*) disposed on the support (1) and a high refractive index layer (2*b*) disposed on the low refractive index layer and having a higher refractive index than the refractive index of the low refractive index layer; and an adhesive layer (3) on the antireflection layer (2), wherein the high refractive index layer (2*b*) contains metal oxide fine particles, and a photo-polymerization initiator and/or a photosensitizer, the adhesive which constitutes the adhesive layer (3) is an active energy ray-curable adhesive and the high refractive index layer (2*b*) is impregnated with a portion of the adhesive, and the support (1) is releasable from the antireflection layer(21).

15 Claims, 2 Drawing Sheets

(a)

(b)

ANTIREFLECTION FILM AND OBJECT HAVING UNDERGONE ANTIREFLECTION TREATMENT

CROSS REFERENCES TO RELATED APPLICATIONS

This application is a national stage application of International Patent Application No. PCT/JP03/009499, filed on Jul. 25, 2003, and claims priority to Japanese Patent Application No. 2002-222900, filed on Jul. 31, 2002, both of which are incorporated herein by reference in their entireties.

TECHNICAL FIELD

The present invention relates to an antireflection film for transfer and to an antireflection-treated article to the surface of which the antireflection film has been transferred. More specifically, the present invention relates to an antireflection film for transfer that can be transferred to the surface of an article to form an antireflection layer that has a high antireflection effect and a high solvent resistance. The present invention also relates to an antireflection-treated article using such an antireflection film for transfer.

The present invention further relates to an antireflection film for transfer that offers an antistatic function in addition to the antireflective function. It also relates to an antireflection and antistatic-treated article to the surface of which the antireflective, antistatic film has been transferred.

Articles that can be antireflection-treated according to the present invention include any less-flexible article or support, such as a plate, that is difficult to form a coating layer with a uniform thickness, and articles made of glass or ceramics. For example, various display devices, such as CRTs, LCDs, screens for use with rear projectors, and electroluminescence displays, generally require antireflection treatment on the display surfaces. These devices thus serve as good examples of articles that can be antireflection-treated according to the present invention.

BACKGROUND ART

Conventionally, antireflection treatments to the surface of CRTs and other display devices have been performed using techniques such as sputtering and spin-coating. However, these techniques can process only a single surface at a time and are thus not sufficiently productive. For this reason, it is becoming more common, rather than to directly provide antireflection-treatment to the surface of CRTs and other display devices, to produce an antireflection film in a much more effective, continuous, roll-to-roll manner using a flexible film as a support and then use this antireflection film as a antireflection-treatment to the surface of CRTs and other display devices.

Japanese Laid-Open Patent Publication No. 7-225302 (1995) describes a technique for laminating an antireflection film on the surface of an article. According to the publication, however, a supporting film for the antireflection film is located on the surface of the article and the antireflection layer is located on the supporting. The presence of the supporting film causes problems such as a decrease in the surface hardness, increase in haze, decrease in the light transmittance, and increase in the total thickness of the surface coating. These problems are significant as far as the surface of CRTs and other display devices are concerned.

Japanese Laid-Open Patent Publication No. 2000-338306 describes a transfer material for use in the production of an antireflective antistatic plate. This material comprises a siloxane-based resin layer serving as a low refractive index layer on the surface of a base film that has a release property; a metal oxide-containing layer serving as a high refractive index layer on the siloxane-based resin layer; and an adhesive layer on the metal oxide-containing layer. The antireflection layer formed by using this transfer material, however, has a lower solvent resistance as compared to antireflection layers formed by sputtering.

In addition to being antireflection-treated, the surface of the various display devices must be highly resistant to solvents in order for the surface to be suitable for practical use.

DISCLOSURE OF THE INVENTION

Objects of the Invention

In view of the above-described technical background, a need exists for the development of an antireflection film for transfer that can conveniently provide an antireflection layer with a uniform thickness on plates or other less-flexible articles, and can be transferred to the surface of the articles to form an antireflection layer offering a high antireflection effect on a light in the visible light range as well as a high solvent resistance.

Accordingly, it is an objective of the present invention to provide an antireflection film for transfer that can be transferred to the surface of plates or other less-flexible articles to form an antireflection layer with a uniform thickness that not only provides a high antireflection effect on a light in the visible light range but also offers a high solvent resistance. It is another objective of the present invention to provide an antireflection-treated article using such an antireflection film for transfer.

SUMMARY OF THE INVENTION

The present inventors made eager investigation. As a result, the present inventors have found out that by adding a photopolymerization initiator and/or a photosensitizer to the high refractive index layer containing the metal oxide fine particles, the curing reaction of the curable component in the adhesive with which the high refractive index layer is impregnated is facilitated following the transfer of the antireflection layer. As a result, the high refractive index layer becomes harder and the antireflection layer formed on the surface of the article acquires a high solvent resistance. Thus, the present invention has been made.

The present invention is an antireflection film for transfer comprising:

a support, an antireflection layer on the support and said antireflection layer comprising a layer or layers, and an adhesive layer on the antireflection layer, wherein at least one of the layers which constitute the antireflection layer is a high refractive index layer containing metal oxide fine particles, and a photopolymerization initiator and/or a photosensitizer, the adhesive which constitutes the adhesive layer is an active energy ray-curable adhesive, and the high refractive index layer is impregnated with a portion of the adhesive, and the support is releasable from the antireflection layer.

The present invention is an antireflection film for transfer comprising:
a support,
an antireflection layer comprising a low refractive index layer disposed on the support and a high refractive index layer disposed on the low refractive index layer and having a higher refractive index than the refractive index of the low refractive index layer, and
an adhesive layer on the antireflection layer,
wherein the high refractive index layer contains metal oxide fine particles, and a photopolymerization initiator and/or a photosensitizer,
the adhesive which constitutes the adhesive layer is an active energy ray-curable adhesive, and the high refractive index layer is impregnated with a portion of the adhesive, and
the support is releasable from the antireflection layer. The present invention is the above-described antireflection film for transfer, wherein the low reflective index layer and the high refractive index layer are each formed by coating.

The present invention is the above-described antireflection film for transfer, wherein the high refractive index layer is formed by coating a coating liquid for high refractive index layer which contains the metal oxide fine particles, and the photopolymerization initiator and/or the photosensitizer. The present invention is the above-described antireflection film for transfer, wherein the high refractive index layer contains the photopolymerization initiator and/or the photosensitizer in an amount of 0.01 to 50 wt % with respect to the metal oxide fine particles.

The present invention is the above-described antireflection film for transfer, wherein the metal oxide fine particles contained in the high refractive index layer are surface-treated with a compound having a crosslinkable functional group, and the adhesive contains a component which is crosslinkable with the crosslinkable functional group. The present invention is the above-described antireflection film for transfer, wherein the crosslinkable functional group of the compound having the crosslinkable functional group is an unsaturated double bond or an epoxy group.

The present invention is the above-described antireflection film for transfer, wherein the metal oxide fine particles contained in the high refractive index layer comprise electrically-conductive fine particles.

The present invention is an antireflection-treated article on the surface of which the antireflection layer of any of the above-described antireflection films for transfer has been transferred and formed via the adhesive layer. The present invention is the above-described antireflection-treated article, wherein the article to be antireflection-treated is a display device.

BRIEF DESCRIPTION OF THE DRAWINGS

FIG. 3(a) is a schematic perspective view of an evaluation apparatus; and FIG. 3(b) is a side view of the same apparatus.

MODES FOR CARRYING OUT THE INVENTION

Figure 1:
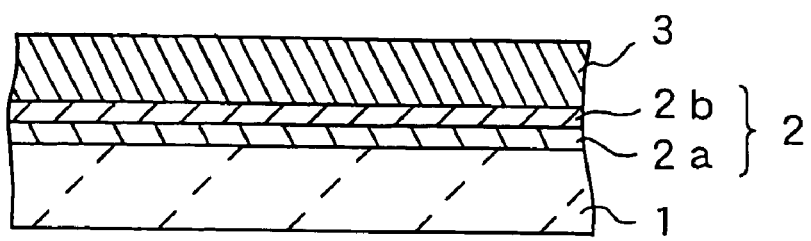
FIG. 1 is a cross-sectional view showing an example of the layer constitution of an antireflection film for transfer of the present invention.
Figure 2:
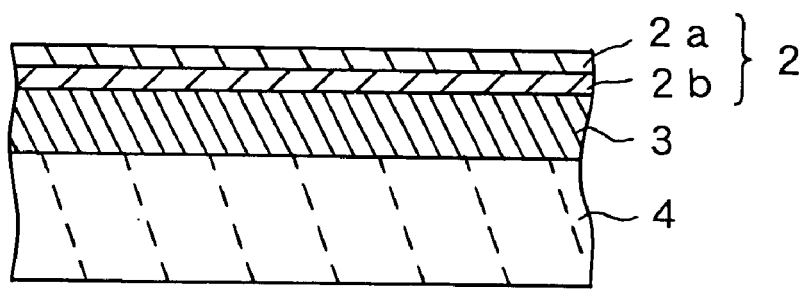
FIG. 2 is a cross-sectional view showing an example of the layer constitution of an antireflection-treated article on the surface of which the antireflection layer of the antireflection film for transfer of the present invention has been transferred and formed.

The present invention will now be described in further detail with reference to the accompanying drawings, in which FIG. 1 is a cross-sectional view showing an example of the layer constitution of an antireflection film for transfer of the present invention; and FIG. 2 is a cross-sectional view showing an example of the layer constitution of an antireflection-treated article on the surface of which the antireflection layer of the antireflection film for transfer of the present invention has been transferred and formed. The term "transfer" as used herein is intended to mean that the antireflection layer on a support is stuck to other objects via the adhesive layer.

Referring to FIG. 1, an antireflection film for transfer includes a support (1), an antireflection layer (2) disposed on the support (1), and an adhesive layer disposed on the antireflection layer (2). The antireflection layer (2) is comprised of a low refractive index layer (2a) on the support (1) and a high refractive index layer (2b) on the low refractive index layer (2a). The low refractive index layer (2a) and the high refractive index layer (2b) have different refractive indices. The support (1) is releasable from the antireflection layer (2) when the antireflection layer (2) is transferred from the support (1) to the surface of an article to be antireflection-treated. A separator (not shown) may be further formed on the adhesive layer (3).

A high refractive index and a low refractive index are relative and are determined by comparing the refractive index of the high refractive index layer with that of the low refractive index layer. Because of such a layer constitution in the antireflection layer (2), the support (1) is released from the antireflection layer (2) so that the low refractive index layer (2a) becomes the outermost layer relative to the surface of the article, when the antireflection layer (2) is transferred from the support (1) to the surface of the article. This enhances the antireflection effect of the antireflection layer (2).

While one example in which the antireflection layer (2) consists of the low refractive index layer (2a) and the high refractive index layer (2b) has been described with reference to FIG. 1, the present invention also contemplates antireflection films for transfer with an antireflection layer (2) having any of the following constitutions:
an antireflection layer (2) consisting of a single low refractive index layer (2a);
an antireflection layer (2) consisting of a low refractive index layer (2a), a high refractive index layer (2b), and an intermediate refractive index layer disposed between the low refractive index layer (2a) and the high refractive index layer (2b) and having a refractive index that is higher than the refractive index of the low refractive index layer (2a) and is lower than the high refractive index layer (2b); and
an antireflection layer (2) consisting of a low refractive index layer (2a), a high refractive index layer (2b) on the low refractive index layer (2a), and an additional intermediate refractive index layer or a low refractive index layer on the high refractive index layer (2b) and having a refractive index that is at least lower than the refractive index of the high refractive index layer (2b).

While the support (1) maybe formed of any suitable material, flexible resin films are preferred since they are lightweight and easy to handle. Examples of such resin films include polyester films such as polyethylene terephthalate (PET), polyolefin films such as polyethylene and polypropylene, polycarbonate film, acryl film, and norbornene film (ARTON, manufactured by JSR Corp.). Aside from the resin films, cloth, paper and the like may be used as the support. Alternatively, resin films surface-treated with a releaser may preferably be used.

The low refractive index layer (2a) has a refractive index of for example 1.35 or larger and smaller than 1.6. The physical thickness of the low refractive index layer (2a) is preferably 0.05 μm or larger and smaller than 0.5 μm, and more preferably 0.07 μm or larger and 0.2 μm or smaller.

Preferably, the low refractive index layer (2a) is formed as a hard coat layer that contains a resin as a major component. The hard coat layer becomes the outermost layer relative to the surface of the article when the antireflection layer (2) is transferred from the support (1) to the surface of the article. In this manner, the hard coat layer can provide scratch resistance as well as antireflection effect.

Hard coat layers that are formed of silicone resins (which have, for example, a hardness as measured in the pencil hardness of higher than 4H, preferably 5H or higher) generally show only weak adhesion to PET or other resin films and are readily releasable from the support (1). In the present invention, if the surface of the support (1) is treated with a releaser, then the adhesion of the support (1) to the hard coat layer becomes excessively weak, posing problems during application of the high refractive index layer (2b) onto the hard coat layer, such as the hard coat layer being released from the support.

For this reason, it is preferred that the surface of the support (1) be corona-treated to increase the adhesion to the hard coat layer. Alternatively, an easy adhesive agent may be applied to the surface of the support (1). For example, if the coating liquid used to form the high refractive index layer (2b) on the low refractive index layer (2a) contains little or no binder resin, then the surface of the support (1) may preferably be corona-treated (Formation of the high refractive index layer (2b) by coating will be described later).

Thus, those supports that are treated with an easy adhesive agent and those supports that are corona-treated are also regarded as support (1).

The hard coat layer, or the low refraction index layer (2a), can be formed by applying a liquid, in which hard coat agent is dissolved if necessary, onto the support (1), drying the agent, and then curing the agent.

Such a hard coat agent may be any known hard coat agent, including thermosetting hard coat agents such as silicone-based, acryl-based, or melamine-based hard coat agents. Of these, silicone-based hard coat agents are preferred since they can provide high hardness.

Alternatively, ultraviolet ray-curable hard coat agents may be used, including radical polymerizable hard coat agents, such as unsaturated polyester resin-based and acryl-based hard coat agents, and cationic polymerizable hard coat agents, such as epoxy-based and vinyl ether-based hard coat agents. These ultraviolet ray-curable hard coat agents are preferred since they readily undergo curing reaction and thus facilitate the production of the antireflection film. Of these, acryl-based radical polymerizable hard coat agents are particularly preferred in terms of their reactivity in the curing reaction and surface hardness.

The hard coat agent may be applied using any known coating method, including roll coaters such as gravure coaters and reverse rolls, Mayer bar applicators, and slit die coaters.

After the application, the hard coat agent is dried at a proper temperature range and is then cured. The thermosetting hard coat agents are generally cured by applying a proper amount of heat. For example, a silicone-based hard coat agent may be cured by heating at about 60 to 120° C. for 1 minute to 48 hours. The ultraviolet ray-curable hard coat agents are cured by irradiating with ultraviolet rays. Ultraviolet rays may be irradiated to a dose of about 200 to 2000 mJ/cm$^2$ using various lamps such as a xenon lamp, low-pressure mercury lamp, medium-pressure mercury lamp, high-pressure mercury lamp, ultra-high-pressure mercury lamp, metal halide lamp, carbon arc lamp, and tungsten lamp.

The hard coat layer may contain an ultraviolet ray absorber. Such an ultraviolet ray absorber may be any known ultraviolet ray absorber, including salicylic acid type ultraviolet ray absorbers, benzophenone type ultraviolet ray absorbers, benzotriazole type ultraviolet ray absorbers, and cyanoacrylate type ultraviolet ray absorbers. When necessary, the hard coat layer may further contain various known additives, including photo-stabilizers, such as hindered-amine type photo-stabilizers, antioxidants, antistatic agents, and flame retardants. These ultraviolet ray absorbers and additives may be added to the hard coat agent so that they can be applied by coating.

The high refractive index layer (2b) is a layer that contains metal oxide fine particles to establish a high refractive index of the layer, and a photopolymerization initiator and/or a photosensitizer. The high refractive index layer (2b) has a refractive index of for example 1.6 or more and 2.5 or less. The physical thickness of the high refractive index layer (2b) is preferably 0.05 μm or larger and smaller than 0.5 μm, and more preferably 0.06 μm or larger and 0.2 μm or smaller.

Examples of the metal oxide fine particles for use in the high refractive index layer (2b) include tin oxide, zinc oxide, titanium oxide, zirconium oxide and other fine particles that can provide a high refractive index, as well as antimony-doped tin oxide (ATO), tin-doped indium oxide (ITO) and other electrically-conductive fine particles that can provide a high refractive index. These fine particles preferably have an average particle size of 10 to 30 nm. These materials may be used in combination to adjust the refractive index.

According to the present invention, the high refractive index layer (2b) contains a photopolymerization initiator and/or a photosensitizer. The photopolymerization initiator and/or the photosensitizer are suitably selected depending on the type of the active energy ray-curable adhesive used in the adhesive layer (3), which will be described later.

When an active energy ray-curable, acryl-based adhesive is employed as the adhesive, a radical photo initiator is used as the photopolymerization initiator. Examples of such a radical photo initiator include DAROCURE 1173, IRGACURE 651, IRGACURE 184, and IRGACURE 907 (each manufactured by Ciba Specialty Chemicals Inc.), and KAYACURE DETX-S (manufactured by Nippon Kayaku). When an active energy ray-curable, epoxy-based adhesive is employed as the adhesive, a cationic photoinitiator is used as the photopolymerization initiator. Examples of such a cationic photoinitiator include onium salts, such as diazonium salts, sulfonium salts, and iodonium salts. Aromatic onium salts are particularly preferred. Also preferred are iron-arene complexes such as ferrocene derivatives, and aryl silanol aluminum complexes. These cationic photoinitiators are properly selected. Among specific products of the cationic photoinitiators are CYRACURE UVI-6970, CYRACURE UVI-6974, and CYRACURE UVI-6990 (each manufactured by Dow Chemical, USA), IRGACURE 264 (manufactured by Ciba Specialty Chemicals Inc.), and CIT-1682 (manufactured by Nippon Soda). These components are also added to the adhesive, which will be described later.

Examples of the photosensitizer include aromatic ketones, xanthone, thioxanthone derivatives, phenothiadine, diphenyl anthracene, rubrene, and aromatic sulfonium salts. These components may be added to the adhesive, which will be described later. Particularly preferred are thioxanthone derivatives (e.g., 2-propyl form and 2-chloro form).

According to the present invention, the high refractive index layer (2b) is impregnated with a portion of the active energy ray-curable adhesive (i.e., active energy ray-curable, acryl-based adhesive or active energy ray-curable, epoxy-based adhesive) used in the adhesive layer (3). Upon irradiation with ultraviolet rays, visible rays or other active energy rays after the antireflection film for transfer has been transferred to the article, the presence of the photopolymerization initiator and/or the photosensitizer in the high refractive index layer (2b) facilitates the curing reaction of the active energy ray-curable component, in particular the monomer component, in the adhesive with which the high refractive index layer (2b) has been impregnated. Not only does this increase the film strength and adhesion of the high refractive index layer (2b), but it also improves the solvent resistance of the high refractive index layer (2b).

Preferably, the metal oxide fine particles are surface-treated with a compound having a crosslinkable functional group. Such crosslinkable functional groups are not limited to particular functional groups and include epoxy group, and vinyl group, acryl group, methacryl group, and other functional groups having unsaturated double bonds.

One example of the compounds that include functional groups that contain vinyl group, (meth)acryl group, or other functional groups with unsaturated double bonds is silane coupling agents having unsaturated double bonds. Specific examples of such silane coupling agents include divinyldimethoxysilane, divinyldi-β-methoxyethoxysilane, vinyltriethoxysilane, vinyltris-β-methoxyethoxysilane, γ-(meth)acryloxypropyltrimethoxysilane, γ-(meth)acryloxypropyltriethoxysilane, and γ-(meth)acryloxypropylmethyldiethoxysilane.

The surface treatment of the metal oxide fine particles with the silane coupling agent can be carried out, for example, by mixing the two components in an alcohol, such as methanol, at room temperature. It is believed that alkoxy groups in the silane coupling agent are hydrolyzed and bonds are then formed between the hydroxyl residues on the surface of the metal oxide fine particles and Si.

Some examples of the compounds containing (meth)acryl group or other functional groups with unsaturated double bonds are (meth)acrylic acids and ester compounds thereof. Among specific examples are (meth)acrylic acids, methyl (meth)acrylate, ethyl(meth)acrylate, hydroxyethyl(meth)acrylate, and hydroxypropyl(meth)acrylate.

The surface treatment of the metal oxide fine particles with the (meth)acrylic acid or (meth)acrylate can be carried out, for example, by mixing the two components in an alcohol, such as methanol, at room temperature. It is believed that (meth)acryloyl groups are introduced into the hydroxyl residues on the surface of the metal oxide fine particles. Alternatively, acidhalides, such as (meth)acrylic acid chloride, may be reacted with the metal oxide fine particles to introduce (meth)acryloyl groups into the surface of the metal oxide.

Upon irradiation with ultraviolet rays, visible rays or other active energy rays after the antireflection film for transfer has been transferred to the article, the crosslinkable functional groups imparted to the surface of the metal oxide fine particles through the surface treatment form crosslinks with the active energy ray-curable component, in particular, the monomer component, in the adhesive with which the high refractive index layer (2b) has been impregnated. It is believed that the photopolymerization initiator and/or the photosensitizer, which have previously been added to the high refractive index layer (2b), tend to localize in the vicinity of the surface-treated fine particles where they facilitate the crosslinking/curing reaction after the antireflection film for transfer has been transferred to the article. As a result, the hardness of the high refractive index layer (2b) after irradiation with the active energy rays is improved, as are the adhesion between the high refractive index layer (2b) and the adhesive layer (3) and the solvent resistance of the antireflection layer.

In cases where the crosslinkable functional groups are unsaturated double bond-containing functional groups such as vinyl group, acryl group, and methacryl group, the acryl-based monomer component in the active energy ray-curable, acryl-based adhesive form crosslinks with the unsaturated double bonds by a radical reaction. Where the crosslinkable functional groups are epoxy groups, they bind to the active energy ray-curable, epoxy-based adhesive component by a cationic polymerization.

In order to ensure high film strength, high adhesion, and good solvent resistance, the high refractive index layer (2b) contains the photopolymerization initiator and/or the photosensitizer in an amount of preferably from 0.01 to 50 wt %, more preferably from 0.1 to 20 wt %, and most preferably from 1 to 10 wt % with respect to the metal oxide fine particles (total amount of the photopolymerization initiator and the photosensitizer when the two agents are both used). If the amount is larger than 50 wt %, then the filling factor of the metal oxide fine particles is lowered, whereas if the amount is smaller than 0.01 wt %, then the effect of the addition of the photopolymerization initiator and/or the photosensitizer is difficult to be achieved.

The high refractive index layer (2b) can be formed by applying, onto the low refractive index layer (2a), a coating liquid for high refractive index layer that preferably contains the metal oxide fine particles, and the photopolymerization initiator and/or the photosensitizer at the above-specified proportions, and then drying the liquid.

The coating liquid for high refractive index layer can be prepared by dispersing the metal oxide fine particles, and the photopolymerization initiator and/or the photosensitizer, in an organic solvent or other proper solvents. A binder resin may be used, though it is preferably omitted. When binder resins are used, they are typically used in amounts not exceeding 25 wt %, preferably in amounts not exceeding 20 wt %, with respect to the total amount of the binder resin and the fine particles. If the amount of the binder resin is excessively large to the point where it covers the entire surface of the surface-treated metal oxide fine particles, then the adhesive component with which the high refractive index layer (2b) has been impregnated can hardly form crosslinks with the crosslinkable functional groups on the surface of the fine particles. This is undesirable.

The coating liquid for forming the high refractive index layer may be applied onto the low refractive index layer (2a) using any known coating method, including roll coaters such as gravure coaters and reverse rolls, Mayer bar applicators, and slit die coaters. After the application, the coating may be dried at a proper temperature range of about 40 to 120° C. for 10 seconds to 5 minutes.

It is also preferred that the high refractive index layer (2b) is compressed following its application and drying. For instance, the high refractive index layer (2b) maybe compressed when the metal oxide fine particles are electrically-conductive fine particles such as ATO. This improves the electrical conductivity of the high refractive index layer (2b). In this manner, the high refractive index layer (2b) is formed.

The adhesive layer (3) is then formed on the high reflective index layer (2b). The adhesive layer (3) may be formed by applying an adhesive coating liquid onto the high refractive index layer (2b) and then drying the liquid. If desired, a separator is further placed on the adhesive layer (3) to protect the surface of the adhesive layer until use. The adhesive layer (3) is for example 1 to 100 µm thick, preferably 5 to 20 µm thick.

According to the present invention, the adhesive is an active energy ray-curable adhesive, such as active energy ray-curable, acryl-based adhesives or active energy ray-curable, epoxy-based adhesives. Preferred adhesives are those that can form a tacky adhesive layer with little fluidity just by applying the adhesive liquid and drying it and that can form a hard layer when cured by ultraviolet rays or other active energy rays after the antireflection film for transfer has been stuck to a desired article. Preferably, the adhesive layer should not soften or deteriorate once it has been stuck to the article and cured. The tackiness of the adhesive layer helps stick the antireflection film for transfer to the article. The very small fluidity of the adhesive layer enables placement of a separator that serves to protect the adhesive layer from the time when the adhesive layer is formed until the antireflection film for transfer is used.

Accordingly, the adhesive for use in the adhesive layer (3) is preferably one of the following active energy ray-curable, acryl-based adhesive compositions:

1. An adhesive composition that contains an acryl-based resin component (P) having a glass transition temperature Tg of 30° C. or above and a curable acryl-based monomer component (M) such that the weight ratio of P/M is from not less than 2/8 to not more than 8/2;

2. The adhesive composition according to 1 above, wherein the acryl-based resin component (P) is a solid at room temperature and the curable acryl-based monomer component (M) is a liquid at room temperature; and 3. The adhesive composition according to 1 or 2 above, further containing a photopolymerization initiator and/or a photosensitizer.

The ratio P/M is preferably in the range of from not less than 2/8 to not more than 8/2 in order to ensure high initial tackiness and hardness after curing. The initial tackiness is ensured when the acryl-based monomer (M) is such that it is a liquid at room temperature and the acryl-based resin (P) is such that it is a solid at room temperature. If P/M is more than 8/2, then the initial tackiness tends to be decreased whereas if P/M is less than 2/8, then the viscosity of the liquid of the adhesive composition becomes excessively low, resulting in insufficient sticking of the adhesive layer.

Examples of the acryl-based resin components (P) include acryl resins 103B and 1BR-305 (manufactured by Taisei Kako). Examples of the curable acryl-based monomer components (M) include acryl-based monomers having trifunctional or higher functional groups, such as KAYARAD GPO-303, KAYARAD TMPTA, and KAYARADTHE-330 (each of which is manufactured by Nippon Kayaku). The photopolymerization initiator may be of various types, one example being KAYACURE DETX-S (manufactured by Nippon Kayaku). One example of a material that contains a curable acryl-based monomer component and a photo polymerization initiatoris SD-318 (manufactured by Dainippon Ink and Chemicals). When it is desired to cure the adhesive layer with visible rays, a photosensitizer may be added.

When the adhesive coating liquid is applied on the antireflection layer (2), the high refractive index layer (2b) is impregnated with the adhesive. In particular, the high refractive index layer (2b) is readily impregnated with the curable monomer component contained in the adhesive. The impregnation of the adhesive components into the high refractive index layer (2b) brings about the aforementioned effects. According to the present invention, the high hardness of the high refractive index layer (2b), the high adhesion between the high refractive index layer (2b) and the adhesive layer (3), and the high solvent resistance of the antireflection layer are ensured even when the dispersion of the metal oxide fine particles used to form the high refractive index layer (2b) contains little or no binder resins.

Moreover, by allowing the adhesive to penetrate through the high refractive index layer (2b) as far as to the low refractive index layer (2a), the adhesion between the high refractive index layer (2b) and the low refractive index layer (2a) is increased, as are the overall hardness and adhesion of the adhesive layer and the antireflection layer following the transfer of the antireflection film. For the high refractive index layer (2b) that does not contain the binder resin, this effect can be easily obtained when its thickness is 2 µm or less. For the high refractive index layer (2b) that contains the binder resin, the effect can be easily obtained when its thickness is less than 0.5 µm. In this case, the above-described effect becomes more significant when the thickness of the high refractive index layer (2b) is 0.2 µm or less.

It is preferred that once transferred to the article and then cured, the adhesive layer (3) has an refractive index close to the refractive index of the article. A large difference between the two refractive indices may result in more of the reflected light on the interface between the adhesive layer and the article.

A pigment, a dye, or the like may be dispersed or dissolved in the adhesive layer. Preferred pigments are those selected from known scratch-resistant materials, such as silica, and inorganic coloring materials. Hence, the antireflection film for transfer of the present invention is obtained.

The present invention also concerns an antireflection-treated article on the surface of which the antireflection layer of the above-described antireflection film for transfer has been transferred and formed via the adhesive layer. FIG. 2 shows an example of the layer constitution in an antireflection-treated article using the antireflection film for transfer of FIG. 1, and is a cross-sectional view showing an example of the layer constitution that the antireflection layer (2) is formed via the adhesive layer (3) to the surface of the article (4) to be antireflection-treated. The adhesive layer (3) is shown cured.

The article (4) to be antireflection-treated is not limited to a particular article and includes various articles. For example, it includes any less-flexible article or support, such as a plate, that is difficult to form a coating layer with a uniform thickness, articles made of glass or ceramics, and films, sheets and plates made of resins. Various display devices, such as CRTs, LCDs, screens for use with rear projectors, and electroluminescence displays, generally require antireflection treatment on the display surfaces. Thus, these devices serve as good examples of articles that can be antireflection-treated according to the present invention.

The antireflection film for transfer of the present invention is stuck via the adhesive layer (3) to the surface of the article (4) to be antireflection-treated, with the support (1) positioned outside. Once the antireflection film is stuck, active energy rays such as ultraviolet rays are irradiated to cure the adhesive layer (3) and the support (1) is then released, leaving the antireflection layer (2) on the surface of the article (4). Ultraviolet rays are effective as irradiating light rays although visible rays may be used. The irradiating time is properly selected depending on the photosensitivity of the active energy ray-curable resin composition used and the type of rays. In this manner, an antireflection layer with a high antireflection effect and a high solvent resistance can be transferred and formed onto the surface of the article.

When the hard coat layer (2a) contains the ultraviolet ray absorber, irradiating ultraviolet rays onto the antireflection film stuck to the article from the side of the hard coat layer (2a) can hardly cure the adhesive layer (3). In such cases, ultraviolet rays may be irradiated from the side of the article, given that the article is transparent. When the article is opaque, the photosensitizer may be added to each of the adhesive layer (3) and the high reflective index layer (2b) of the antireflection film and visible rays may be irradiated from the side of the hard coat layer (2a).

EXAMPLES

The present invention will now be described in more detail with reference to Examples, which are only illustrative and do not limit the scope of the invention in any way.

Example 1

In the manner as described with reference to FIG. 1, an antireflection film for transfer, which included a low refractive index layer (2a), a high refractive index layer (2b), and an adhesive layer (3) in this order on a support (1), was formed.

(Formation of Low Refractive Index Layer)

To 100 parts by weight of a silicone-based hard coat liquid KP-854 (manufactured by Shin-Etsu Chemical Co., Ltd.), 400 parts by weight of ethanol were added to form a coating liquid for low refractive index layer. The coating liquid was applied onto a 75 μm thick PET film (1), was dried, and was then cured at 100° C. for 2 hours to form a 0.09 μm thick low refractive index layer (2a).

(Formation of High Refractive Index Layer)

An ethanol dispersion of surface-treated ultrafine particles of tin-doped indium oxide (ITO) was obtained in which the ITO particles had an average primary particle size of approximately 10 nm and had been surface-treated with a vinyl group-containing silane coupling agent (Conc. of solid component=20 wt %, manufactured by Catalysts and Chemicals Industries). To 100 parts by weight of this dispersion and 2 parts by weight of a photopolymerization initiator KAYACURE DETX-S (manufactured by Nippon Kayaku), 300 parts by weight of ethanol were added to form a coating liquid for high refractive index layer. The coating liquid obtained above was applied onto the low refractive index layer (2a) and was then dried to form a 0.09 μm thick high refractive index layer (2b).

(Formation of Adhesive Layer)

To 100 parts by weight of an ultraviolet ray-curable hard coat agent UVHC-1105 (manufactured by GE Toshiba Silicones), which contained an acryl-based monomer as a major component, 76 parts by weight of an acryl-based resin 1BR-305 (Conc. of solid component=39.5 wt %, manufactured by Taisei Kako), and 154 parts by weight of methyl ethyl ketone (MEK) were added to form a coating liquid for adhesive layer. The coating liquid was applied onto the high refractive index layer (2b) and was then dried to form a 10 μm thick adhesive layer (3). The adhesive layer was tacky when touched with a finger. In this manner, an antireflection film for transfer was obtained.

(Transferring Antireflection Layer to Polycarbonate Plate Article)

A 2 mm thick polycarbonate plate was used as an article.

Using a laminator, the antireflection film obtained above was stuck to the polycarbonate plate with the adhesive layer (3) touching one surface of the polycarbonate plate. Ultraviolet rays were then irradiated to cure the adhesive layer (3). Subsequently, the PET film to serve as support (1) was released. The resulting adhesive layer (3) proved to be highly hard. In this manner, the antireflection layer (2: 2a, 2b) was transferred to the polycarbonate plate (4) via the adhesive layer (3) as shown in FIG. 2. The antireflection layer was also adhered to the other side of the polycarbonate plate.

Example 2

An antireflection film for transfer was obtained in the same manner as in Example 1, except that the amount of the photopolymerization initiator KAYACURE DETX-S in the coating liquid for high refractive index layer was 1 part by weight. As in Example 1, the antireflection film for transfer obtained above was used so that an antireflection layer was adhered to each surface of a polycarbonate plate. The resulting adhesive layers were highly hard.

Example 3

An antireflection film for transfer was obtained in the same manner as in Example 1, except that the amount of the photopolymerization initiator KAYACURE DETX-S in the coating liquid for high refractive index layer was 0.5 part by weight. As in Example 1, the antireflection film for transfer obtained above was used so that an antireflection layer was adhered to each surface of a polycarbonate plate. The resulting adhesive layers were highly hard.

Comparative Example 1

An antireflection film for transfer was obtained in the same manner as in Example 1, except that the coating liquid for high refractive index layer did not contain the photopolymerization initiator KAYACURE DETX-S. As in Example 1, the antireflection film for transfer obtained above was used so that an antireflection layer was adhered to each surface of a polycarbonate plate. The resulting adhesive layers were highly hard.

Each of the samples obtained in Examples and Comparative Example was evaluated as follows:

(Evaluation of Antireflection Effect)

A spectrophotometer V-570 (manufactured by JASCO) was used in conjunction with an integrating sphere (manufactured by JASCO) to measure the reflected light at a wavelength of 550 nm and the transmitted light at a wavelength of 550 nm.

(Measurement of Pencil Hardness)

Pencil hardness was measured according to JIS K5400.

(Adhesion Test)

Each obtained sample was tested for adhesion according to the Cross-cut method (JIS K5400): Using a cutter, eleven vertical straight lines and eleven horizontal straight lines, spaced 1 mm from one another, were cut on the antireflection-treated surface of each article (forming total of 100 square grids). A strip of cellophane adhesive tape was adhered to the surface and was then peeled. The number of grids in which the antireflection layer remained unreleasable from the surface of the article was counted. The results are given as follows: i.e., 100/100 indicates that the antireflection layer remained in all of the 100 grids.

(Evaluation of Solvent Resistance)

Using an evaluation apparatus described below, the antireflection-treated surface of each sample was rubbed with a piece of ethanol-impregnated gauze and then the surface was visually inspected. In this experiment, the antireflection layer (3) was transferred to only one surface of a polycarbonate plate (4) to give a sample.

Figure 3:
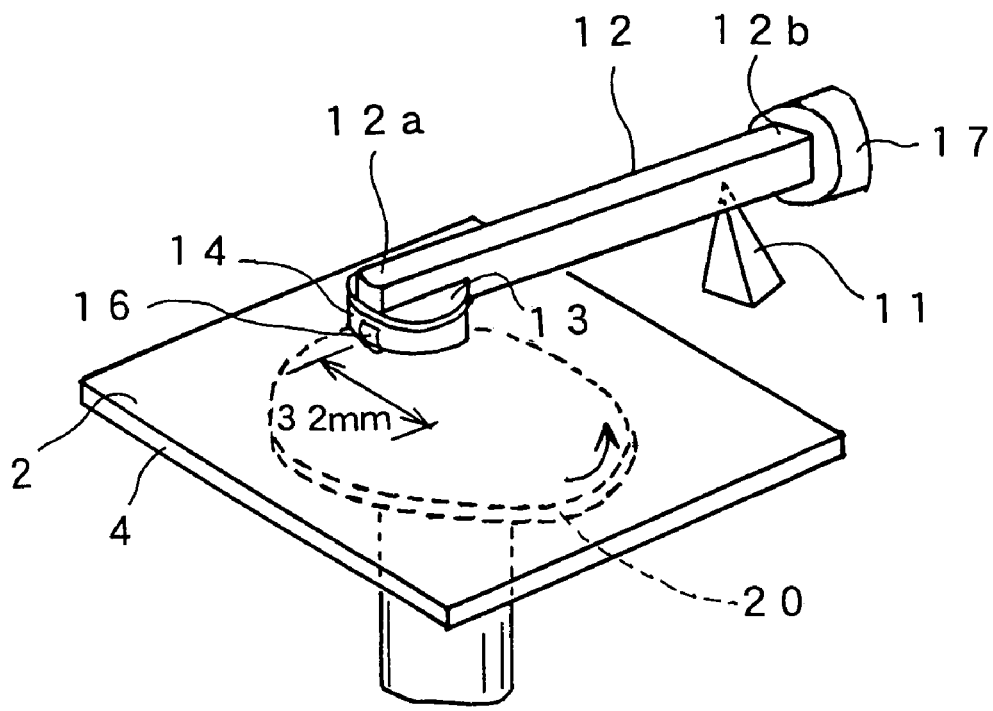
FIG. 3 is a diagram illustrating the manner in which the solvent resistance is evaluated in Examples, where
Figure 3:
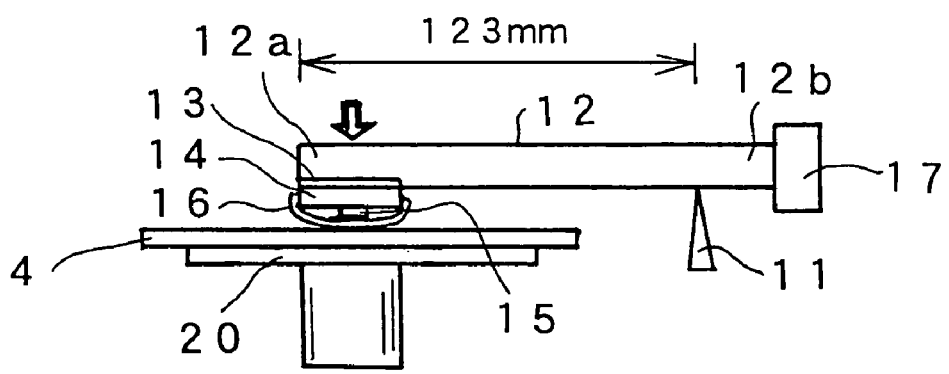

FIG. 3(a) is a schematic perspective view of the evaluation apparatus and FIG. 3(b) is a side view of the same apparatus. Referring to the figures, a cantilever (12) is supported at one end by a support leg (11) and is fitted at the other end (12a) with a disk (13) that is 25 mm in diameter. The distance between the support leg (11) and the end (12a) of the cantilever (12) is 123 mm. A silicone rubber disk (14), 25 mm in diameter and 10 mm thick, is concentrically attached to the disk (13). A 2 mm thick square polycarbonate plate (15) with a side length of 10 mm (each side chamfered) is concentrically attached to one surface of the silicone rubber disk (14) (given that the center of the polycarbonate plate (15) is defined as the intersection of the diagonal lines of the polycarbonate plate). A 60 mm long, 60 mm wide piece of gauze was folded twice to make a 60 mm long, 15 mm wide gauze strip (16). The gauze strip (16) was wrapped around the polycarbonate plate (15) with each end of the gauze strip (16) secured to the periphery of the disk (14). The end (12b) of the cantilever (12) was fitted with a weight (17) to adjust the horizontal balance of the cantilever (12).

A 100 mm ×100 mm sample piece was cut out from the polycarbonate plate (4) that includes the antireflection layer (3) transferred to one surface thereof. The sample polycarbonate plate (4) was mounted on a horizontally installed rotary table (20) with the antireflection layer (3) facing upward. The polycarbonate plate (4) was concentrically secured to the rotary table (20), given that the center of the polycarbonate plate (4) is the intersection of the diagonal lines of the polycarbonate plate (4). The cantilever (12) was held parallel to the surface of the rotary table (20).

The gauze strip (16) was sufficiently impregnated with ethanol and was pressed against the polycarbonate plate (4) while applying a load of 9.8 N. The apparatus was adjusted so that the distance between the center of the silicone rubber disk (14) and the center of the rotary table (20) was 32 mm. The rotary table (20) was then rotated at 100 rpm for 2 minutes. After the rotation was stopped, ethanol was evaporated and the surface of the antireflection layer (2) on the polycarbonate plate (4) was visually observed.

The results of the evaluation of the sample of Example 1 are as follows: No scratches were formed on the surface of the antireflection layer in the solvent resistance test. The antireflection layer of the sample of Example 1 showed high strength when subjected to the harsh environment. Reflectance at 550 nm=2.0%; Transmittance at 550 nm=95%; Pencil hardness=H; Adhesion in the Cross-cut test=100/100.

The results of the evaluation of the sample of Example 2 are as follows: No scratches were formed on the surface of the antireflection layer in the solvent resistance test. The antireflection layer of the sample of Example 2 showed high strength when subjected to the harsh environment. Reflectance at 550 nm=2.0%; Transmittance at 550 nm=95%; Pencil hardness=H; Adhesion in the Cross-cut test=100/100.

The results of the evaluation of the sample of Example 3 are as follows: No scratches were formed on the surface of the antireflection layer in the solvent resistance test. The antireflection layer of the sample of Example 3 showed high strength when subjected to the harsh environment. Reflectance at 550 nm=2.0%; Transmittance at 550 nm=95%; Pencil hardness=H; Adhesion in the Cross-cut test=100/100.

The results of the evaluation of the sample of Comparative Example 1 are as follows: Unlike the sample of Example 1, slight scratches were found on the surface of the antireflection layer in the solvent resistance test. Reflectance at 550 nm=2.0%; Transmittance at 550 nm=95%; Pencil hardness=H; Adhesion in the Cross-cut test=100/100.

While one embodiment has been described, in the above examples, in which the antireflection layer is transferred to the surface of a polycarbonate plate, the present invention also contemplates transferring of the antireflection layer to the surfaces of various other articles. Therefore, the above-mentioned working examples are merely examples in all points, and the present invention should not be restrictedly interpreted by the examples. Furthermore, all modifications belonging to a scope equivalent to that of the claims are within the scope of the present invention.

INDUSTRIAL APPLICABILITY

The present invention provides an antireflection film for transfer that can transfer to, and form on, the surface of plates or any other less-flexible articles an antireflection layer, with a uniform thickness, that exhibits high antireflection effect on a light in the visible light range as well as high solvent resistance. The present invention also provides an antireflection-treated article using such an antireflection film for transfer.

In particular, the present invention provides an antireflection film for transfer that can transfer to, and form on, the surface of display devices an antireflection layer, with a uniform thickness, that exhibits high antireflection effect on a light in the visible light range as well as high solvent resistance. The present invention also provides an antireflection-treated display device using such an antireflection film for transfer.

The invention claimed is:

1. An antireflection film for transfer comprising:
   a support,
   an antireflection layer on the support, and
   an adhesive layer on the antireflection layer,
   wherein;
   the antireflection layer comprises a high refractive index layer comprising metal oxide fine particles, and at least one of a photopolymerization initiator and a photosensitizer,
   the adhesive layer comprises a radiation curable adhesive, and the high refractive index layer is impregnated with a portion of the adhesive,
   the at least one of the photopolymerization initiator and the photosensitizer facilitates curing of the radiation curable adhesive,
   the support is releasable from the antireflection layer, and
   the high refractive index layer is formed by coating a coating liquid comprising the metal oxide fine particles, and the at least one of the photopolymerization initiator and the photosensitizer.

2. The antireflection film for transfer according to claim 1, wherein the at least one of the photopolymerization initiator and the photosensitizer is present in an amount of from 0.01 to 50 wt % with respect to an amount of the metal oxide fine particles.

3. The antireflection film for transfer according to claim 1, wherein the metal oxide fine particles contained in the high refractive index layer are surface-treated with a compound having a crosslinkable functional group, and the adhesive contains a component which is crosslinkable with the crosslinkable functional group.

4. The antireflection film for transfer according to claim 3, wherein the crosslinkable functional group of the compound having the crosslinkable functional group is an unsaturated double bond or an epoxy group.

5. The antireflection film for transfer according to claim 1, wherein the metal oxide fine particles contained in the high refractive index layer comprise electrically-conductive fine particles.

6. An antireflection-treated article comprising an antireflection layer formed on a surface of the article, wherein the antireflection layer is formed by conducting transfer using the antireflection film for transfer according to claim 1.

7. The antireflection-treated article according to claim 6, wherein the article is a display device.

8. An antireflection film for transfer comprising:
a support,
an antireflection layer comprising a low refractive index layer disposed on the support and a high refractive index layer disposed on the low refractive index layer the high refractive index layer having a higher refractive index than the low refractive index layer, and
an adhesive layer on the antireflection layer, wherein;
the high refractive index layer comprises metal oxide fine particles, and at least one of a photopolymerization initiator and a photosensitizer,
the adhesive layer comprises a radiation curable adhesive, and the high refractive index layer is impregnated with a portion of the adhesive,
the at least one of the photopolymerization initiator and the photosensitizer facilitates curing of the radiation curable adhesive,
the support is releasable from the antireflection layer, and
the high refractive index layer is formed by coating a coating liquid comprising the metal oxide fine particles, and the at least one of the photopolymerization initiator and the photosensitizer.

9. The antireflection film for transfer according to claim 8, wherein the low reflective index layer is formed by coating.

10. The antireflection film for transfer according to claim 8, wherein the at least one of the photopolymerization initiator and the photosensitizer is present in an amount of from 0.01 to 50 wt % with respect to an amount of the metal oxide fine particles.

11. The antireflection film for transfer according to claim 8, wherein the metal oxide fine particles contained in the high refractive index layer are surface-treated with a compound having a crosslinkable functional group, and the adhesive contains a component which is crosslinkable with the crosslinkable functional group.

12. The antireflection film for transfer according to claim 11, wherein the crosslinkable functional group of the compound having the crosslinkable functional group is an unsaturated double bond or an epoxy group.

13. The antireflection film for transfer according to claim 8, wherein the metal oxide fine particles contained in the high refractive index layer comprise electrically-conductive fine particles.

14. An antireflection-treated article comprising an antireflection layer formed on a surface of the article, wherein the antireflection layer is formed by conducting transfer using the antireflection film for transfer according to claim 8.

15. The antireflection-treated article according to claim 14, wherein the article is a display device.

\* \* \* \* \*